United States Patent
Baessler et al.

(10) Patent No.: US 9,940,322 B2
(45) Date of Patent: Apr. 10, 2018

(54) TERM CONSOLIDATION FOR INDICES

(71) Applicant: International Business Machines Corporation, Armonk, NY (US)

(72) Inventors: Michael Baessler, Neckartenzlingen (DE); Jochen Doerre, Boeblingen (DE); Thomas A. P. Hampp-Bahnmueller, Stuttgart (DE); Philipp Hoffmann, Weil im Schönbuch (DE); Markus Lorch, Dettenhausen (DE); Juergen Maletz, Wildberg (DE); Daniel Pittner, Steinenbronn (DE)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 14/230,568

(22) Filed: Mar. 31, 2014

(65) Prior Publication Data
US 2015/0278261 A1    Oct. 1, 2015

(51) Int. Cl.
*G06F 17/27* (2006.01)
*G06F 17/22* (2006.01)
*G06F 17/30* (2006.01)

(52) U.S. Cl.
CPC ........ *G06F 17/2735* (2013.01); *G06F 17/22* (2013.01); *G06F 17/2276* (2013.01); *G06F 17/30321* (2013.01)

(58) Field of Classification Search
CPC ............................................... G06F 17/30864
USPC ........................................................ 707/741
See application file for complete search history.

(56) References Cited

U.S. PATENT DOCUMENTS

| | | | |
|---|---|---|---|
| 6,898,623 B1 * | 5/2005 | Williams | H04L 12/58 709/206 |
| 7,609,179 B2 | 10/2009 | Diaz-Gutierrez et al. | |
| 8,131,730 B2 * | 3/2012 | Hajela | G06F 17/30622 707/741 |
| 8,200,646 B2 | 6/2012 | Motoki | |
| 9,292,537 B1 * | 3/2016 | Lee | G06F 17/3012 |
| 2007/0043714 A1 * | 2/2007 | Stanton | G06F 17/30613 |
| 2007/0074131 A1 | 3/2007 | Assadollahi | |
| 2009/0094233 A1 | 4/2009 | Marvit et al. | |
| 2009/0210412 A1 * | 8/2009 | Oliver | G06F 7/02 |

(Continued)

OTHER PUBLICATIONS

"Quantitative Linguistik—Google Books". [online][Retreived on: Feb. 10, 2014]. pp. 716-738. <http://books.google.com/books?id=ODC4ZTwn81wC&pg=PA730&lpg=PA730&dq=%22word+length%22+distribution+law&source=bl&ots=ibVWxJArda&sig=YGdbPztpzyu3MqxfrlUYnP9Szd4&hl=de&sa=X&ei=w3OLUtf1FcbltAa6zlDgCw&ved=0CEkQ6AEwAg#v=onepage&q=%22word%20length%22%20distribution%20law&f=false>.

(Continued)

*Primary Examiner* — Syling Yen
*Assistant Examiner* — Allen Lin
(74) *Attorney, Agent, or Firm* — David Zwick

(57) ABSTRACT

A computer-implemented method, carried out by one or more processors, for consolidating an index entry of a dictionary. In an embodiment, the method comprises the steps of receiving, by one or more processors, a set of parameters, wherein the set of parameters indicates at least a length of prefix and a length of hash value; receiving, by one or more processors, a first term for entry into an index; converting, by one or more processors, the first term for entry into the index according to the set of parameters; and responsive to determining the converted first term is not present in the index, storing, by one or more processors, the first converted term into the index.

10 Claims, 5 Drawing Sheets

DONAUDAMAPFSCHIFFAHRTFF...SCHAFT — 302

P = PREFIX VALUE = 8
H = HASH VALUE = 6  — 304

DONAUDAM | E39AC4  — 306

(56) References Cited

U.S. PATENT DOCUMENTS

| | | | |
|---|---|---|---|
| 2010/0082333 A1* | 4/2010 | Al-Shammari | G06F 17/2735 704/10 |
| 2010/0306831 A1* | 12/2010 | Mu | G06Q 30/06 726/5 |
| 2011/0078153 A1* | 3/2011 | Motoki | G06F 17/30985 707/747 |
| 2012/0330944 A1 | 12/2012 | Vailaya et al. | |
| 2013/0159315 A1 | 6/2013 | Hornkvist et al. | |
| 2015/0095770 A1* | 4/2015 | Mani | G06F 17/2745 715/254 |

OTHER PUBLICATIONS

Baessler, M. et al., U.S. Appl. No. 14/532,058, filed Nov. 4, 2014.
"Zipf's Law—Wikipedia, the free encyclopedia". [online][Retrieved on: Feb. 10, 2014]. <http://en.wikipedia.org/wiki/Zipf's_law>.
"Quantitative Linguistik—Google Books". [online][Retreived on: Feb. 10, 2014]. <http://books.google.com/books?id=ODC4ZTwn81wC&pg=PA730&lpg=PA730&dq=%22word+length%22+distribution+law&source=bl&ots=ibVWxJArda&sig=YGdbPztpzyu3MqxfrlUYnP9Szd4&hl=de&sa=X&ei=w3OLUtf1FcbltAa6zlDgCw&ved=0CEkQ6AEwAg#v=onepage&q=%22word%20length%22%20distribution%20law&f=false>.

\* cited by examiner

| DONAUDAMAPFSCHIFFAHRTFF...SCHAFT | ~302

| P = PREFIX VALUE = 8
H = HASH VALUE = 6 | ~304

| DONAUDAM | E39AC4 | ~306

TERM CONSOLIDATION FOR INDICES

BACKGROUND

In the present day, implemented full text search and indexing mechanisms contribute to creating dictionaries that utilize a large amount of storage space. A typical dictionary contains term entries which are stored in a dictionary portion of an index. The larger the number of term entries, the slower the response when handling queries for search terms. When receiving a document, the document is processed for terms which are then added to the index of the dictionary. Typically, a term is added once to the dictionary and the term is referenced to all occurrences of the word in the documents the dictionary has received. The term is searchable, such that all occurrences of the word can be identified utilizing the index entry for the term.

Existing mechanisms for index entries reduce the size of the entries but also reduce recall for the entries. The reduction in recall is due to word filters removing a number of words or terms from a term being entered into the index. For example, existing mechanism can remove filler words, such as "a" or "the", which the mechanism can deem unnecessary. While this reduces the size of the entry, it also reduces the accuracy of recall when receiving a search term.

SUMMARY

Embodiments of the present invention disclose a method, computer program product and computer system for consolidating an index entry of a dictionary. A computer-implemented method, carried out by one or more processors, for consolidating an index entry of a dictionary comprises the steps of receiving, by one or more processors, a set of parameters, wherein the set of parameters indicates at least a length of prefix and a length of hash value; receiving, by one or more processors, a first term for entry into an index; converting, by one or more processors, the first term for entry into the index according to the set of parameters; and responsive to determining the converted first term is not present in the index, storing, by one or more processors, the converted first term into the index.

DETAILED DESCRIPTION

Embodiments in accordance with the present invention consolidate an index entry of a dictionary by receiving a set of parameters, where the set of parameters indicates a length of prefix and a length of hash value. The length of prefix and the length of hash value may be explicitly included in the set of parameters, or they may be inferred from the set of parameters. For example, the set of parameters may indicate that a specific hash function is to be used, and the hash values generated by that hash function have a predetermined length. Similarly, the length of the prefix may be explicitly included as a parameter or it may be inferred from other information in the set of parameters. The prefix represents a portion of a term and the hash value represents another portion of the term. Embodiments, in accordance with the present invention, can receive a term for entry into an index and convert the term for entry into the index according to the set of parameters (i.e., the length of prefix and the length of hash value). Upon determining the converted term is not present in the index, embodiments, in accordance with the present invention store the converted term into the dictionary portion of the index.

Figure 1:
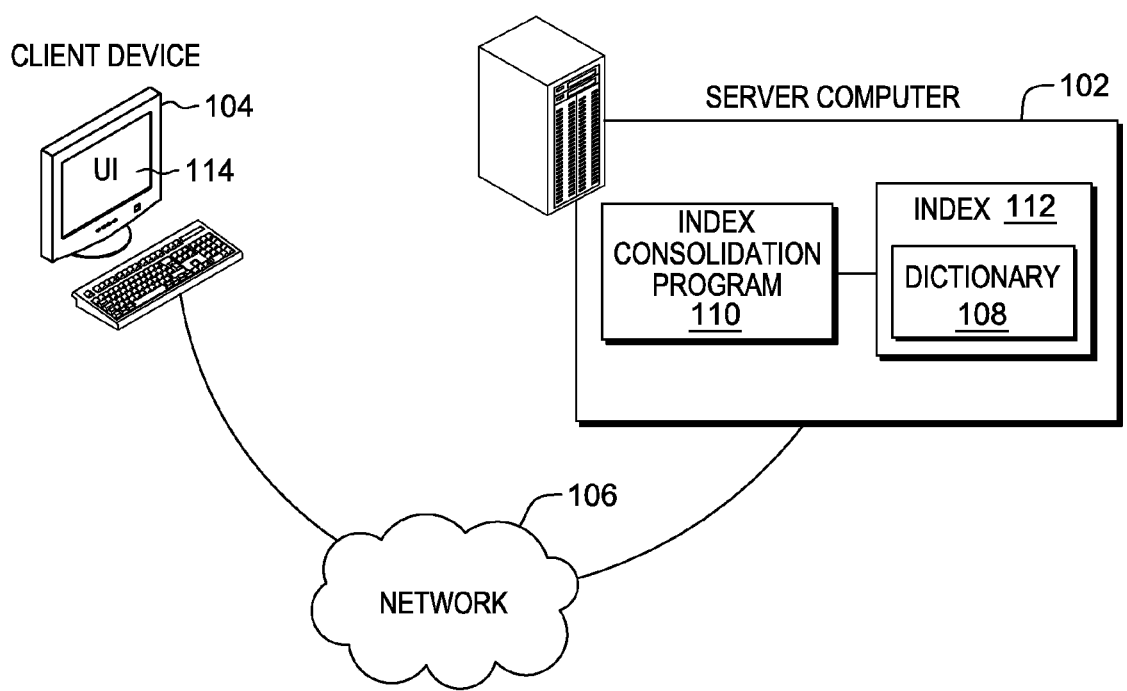
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102 and client device 104 all interconnected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine readable program instructions and communicating with other computer devices via a network. In this embodiment, server computer 102 has the ability to communicate with other computer devices to query the computer devices for information.

Index consolidation program 110 residing in server computer 102 has the ability to consolidate dictionary 108 portion of index 112. Index consolidation program 110 can receive parameters, such as a length of prefix and a length of hash value and can receive a term for entry into index 112. Utilizing the prefix and the hash value information, index consolidation program 110 can convert the received term by calculating the prefix and the hash value for the received term and e.g. concatenating the prefix and the hash value with a separator character in between them into a converted term, and determine if the converted term exists in index 112. If index consolidation program 110 determines the converted term does not exist in index 112, index consolidation program 110 stores the converted term in index 112. In this embodiment, index 112 includes dictionary 108 and posting lists, not illustrated in FIG. 1. A text search engine can utilize dictionary 108, where terms that index consolidation program 110 stores in index 112 are searchable through the text search engine.

In general, network 106 can be any combination of connections and protocols that will support communications between server computer 102 and client device 104. Network 106 can include, for example, a local area network (LAN), a wide area network (WAN), such as the internet, a cellular network, or any combination of the preceding, and can further include wired, wireless, and/or fiber optic connections.

In one embodiment, dictionary 108 and index consolidation program 110 can be a web service accessible via network 106 to a user of a separate device, such as client device 104. In another embodiment, dictionary 108 and index consolidation program 110 may be operated directly by a user of server computer 102.

In various embodiments of the present invention, client device 104 can be a laptop computer, a tablet computer, a netbook computer, a personal computer (PC), a desktop computer, a personal digital assistant (PDA), a smartphone, or any programmable electronic device capable of communicating with server computer 102 via network 106. A user of client device 104 can send a term to dictionary 108 for entry into index 112 via user interface 114.

User interface (UI) 114 on client device 104 displays information that any one of the processes of index consolidation program 110 may display to a user. User interface 114 can be, for example, a graphical user interface (GUI) or a web user interface (WUI) that displays text, documents, web browser windows, user options, application interfaces and instructions for operation. User interface 114 also has the ability to receive user inputs for index consolidation program 110.

Figure 2:
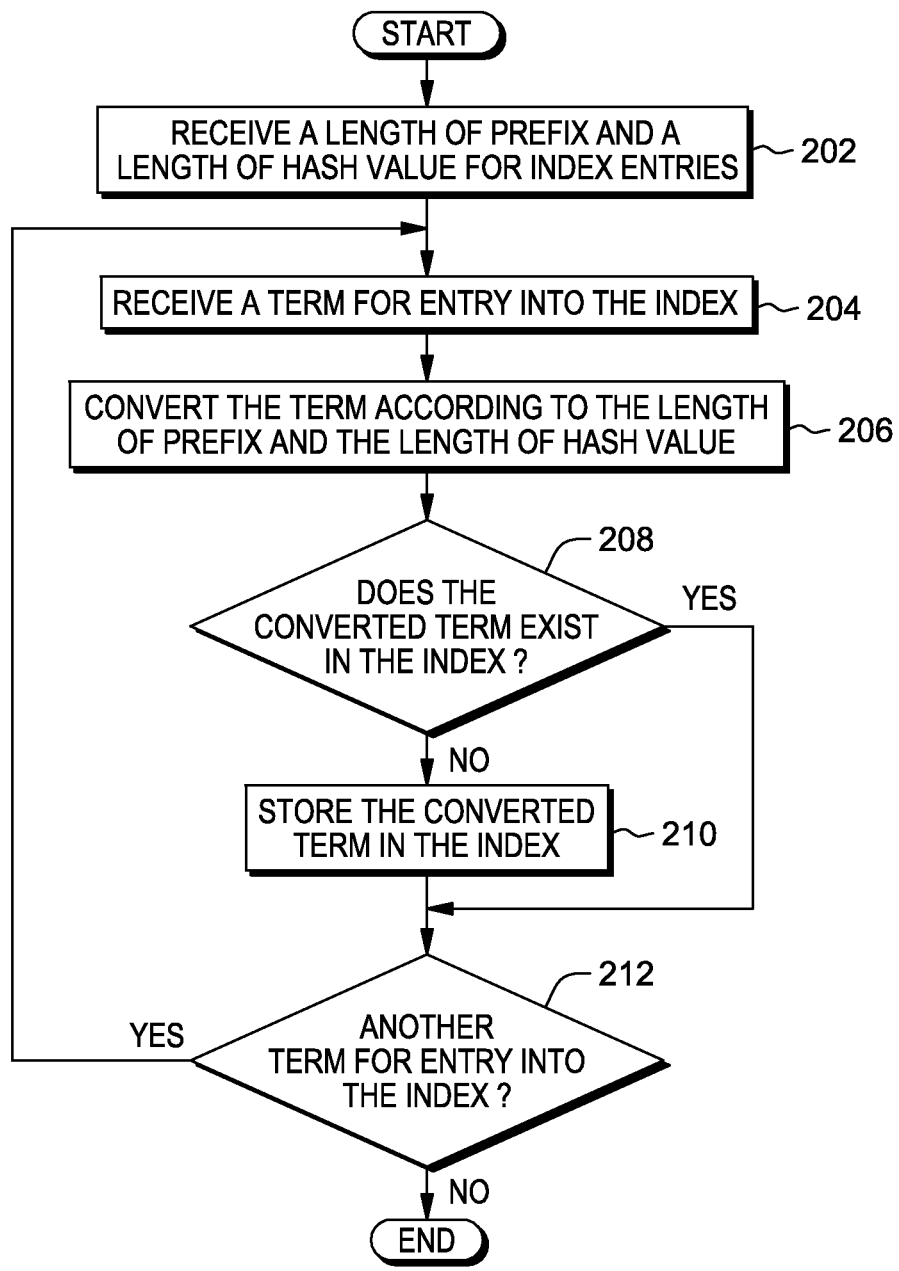
FIG. 2 is a flowchart depicting operational steps of an index consolidation program for consolidating an index of a dictionary, in accordance with an embodiment of the present invention.

FIG. 2 is a flowchart depicting operational steps of an index consolidation program for consolidating an index of a dictionary, in accordance with an embodiment of the present invention.

Index consolidation program 110 receives a length of prefix and a length of hash value for index entries (step 202). For discussion purposes, an index entry is referred to as a term, where the term includes a set of characters. In this embodiment, the length of prefix and the length of hash value both represent character length values for two portions of an index entry (namely for the prefix and the hash portions), for a term that index consolidation program 110 receives. An example of a character can include a letter, a number, a character from a particular alphabetical language, or any other computer recognizable symbol. In this embodiment, a length of prefix is a predetermined number of characters of a term being entered into index 112 of dictionary 108, where the predetermined number of characters corresponds to the initial characters of the term. The predetermined number of character of the term are a portion of the complete term being entered into index 112. In another embodiment, the predetermined number of characters represent the final characters of the term being entered into index 112.

In this embodiment, a length of hash value is a predetermined number of hash characters which represent the other portion of the term. Utilizing a predetermined hash function, index consolidation program 110 can convert the other portion of the term into the predetermined number of hash characters (that is, convert the other portion of the term into a hash value). Index consolidation program 110 can receive the hash function via a user input through user interface 114 and the hash function can be tailored to one or more indices. In this embodiment, index consolidation program 110 receives a length of prefix of 8 and a length of hash value of 4 for index 112 entries into dictionary 108. Index consolidation program 110 can represent the length of prefix of 8 and the length of hash value of 4 by "P=8|H=4".

Index consolidation program 110 receives a term for entry into the index (step 204). In this embodiment, index consolidation program 110 receives the term for entry into index 112 via a user input through user interface 114 on client device 104. Dictionary 108 can receive the term from client device 104 and send the term to index consolidation program 110. In another embodiment, index consolidation program 110 can receive a list of terms being entered into index 112. Index consolidation program 110 can select the first term from the list of terms to convert according to the received lengths of prefix and hash value from step 202.

Index consolidation program 110 converts the term according to the length of prefix and the length of hash value (step 206). In this embodiment, the received length of prefix is 8, the received length of hash value is 4, and the term received is 20 characters long. Index consolidation program 110 can convert the 20 character term, "A1B2C3D4E5F6G7H8I9J1" into an index entry such as "A1B2C3D4|E7H3" where "A1B2C3D4" represents the portion of the term (namely, the prefix of the term) associated with the received length of prefix of P=8 and index consolidation program 110 keeps the initial 8 characters of the term. "E7H3" represents the portion of the term where a hash function was used to convert the other portion of the term into 4 hash characters. Index consolidation program 110 determines that the 4 hash characters are unique to the remaining portion of the received 20 character term. A separator character, such as "|" can separate the two portions of the converted index entry. In another embodiment, the received length of prefix is 6, the received length of hash value is 6, and term is 25 characters long. Index consolidation program 110 can convert the 25 character term, "s234ba135nv234mj469ma889n" into an index entry such as "s234ba|h469ms" where "s234ba" represents the portion of the term associated with the received length of prefix of P=6 and "h469ms" represents the portion of the term associated with the received length of hash value of H=6.

In another embodiment, index consolidation program 110 can determine whether to convert the term based on the number of characters included in the term. For example, index consolidation program 110 can receive a predefined threshold value of 10 characters (i.e., T=10), where, if a term includes 10 or more characters, index consolidation program 110 converts the term. If the term includes less than 10 characters, index consolidation program 110 does not convert the term and stores the received term in the index. In another example, the threshold value (T) is also based on the length of prefix (P) and the length of hash value (H). The sum of the length of prefix, the length of hash value, and the threshold value (i.e., P+H+T) are equal to a minimum number of characters a term can contain in order for index consolidation program 110 to convert the term. If the term includes fewer characters than the sum of P+H+T, index consolidation program 110 determines to not convert the term.

Index consolidation program 110 determines if the converted term exists in the index (decision step 208). In the event index consolidation program 110 determines the converted term exists in the index ("yes" branch, step 208), index consolidation program 110 determines if there is another term for entry into the index (decision step 212). In the event index consolidation program 110 determines the converted term does not exist in the index ("no" branch, step 208) Index consolidation program 110 determines to store the converted term in the index (step 210).

Index consolidation program 110 stores the converted term in the index (step 210). In this embodiment, index consolidation program 110 stores the converted term in index 112 of dictionary 108. In an example, index consolidation program 110 stores an index entry, "s234ba|h469ms" for "s234ba135nv234mj469ma889n", and index consolidation program 110 can direct any reference to "s234ba135nv234mj469ma889n" to the converted index entry. Similarly, index consolidation program 110 can utilize the length of prefix and the length of hash value to convert a search term received by dictionary 108 and match it to the converted index entry. For example, if index consolidation program 110 receives "s234ba135nv234mj469ma889n" as a search term, index consolidation program 110 can utilizes the same steps to convert the search term using the received lengths of prefix and hash values to determine if an index entry exists for the search term. If the search terms exists, index consolidation program 110 can identify the document associated with the search term and can send the search term to dictionary 108.

Index consolidation program 110 determines if there is another term for entry into the index (decision step 212). In the event index consolidation program 110 determines there is another term for entry into the index ("yes" branch, step 212), index consolidation program 110 reverts back to step 204 and receives a term for entry into the index. In the event index consolidation program 110 determines there is no other term for entry into the index ("no" branch, step 212), index consolidation program 110 ceases operations for consolidating entries into index 112 of dictionary 108.

By converting terms for entry into index 112, the storage size of dictionary 108 is reduced with the consolidated terms. With the reduced storage size of dictionary 108, there is minimal impact on quality and the term search capabilities of the search engine utilizing dictionary 108. As previously discussed, index consolidation program 110 can utilize the known lengths of prefix and hash value to convert the search term, and match the search term to any of the stored terms in dictionary 108 of index 112. In an example, index consolidation program 110 can receive just a prefix as a search term and perform a wildcard search for converted terms in dictionary 108 containing the received prefix. There can be an instance where the length of prefix equals 0, where, as a result, the converted term is shorter but the wildcard search capability is no longer available. There can also be an instance where the length of hash value is 0, where as a result the converted term is shorter and precision is lost in the search capabilities of the search engine. Selecting the appropriate lengths of prefix and hash value provides a balance for reducing storage size of dictionary 108 and reducing the impact on search capabilities of the search engine utilizing dictionary 108.

Figure 3:
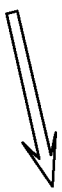
FIG. 3 illustrates an example of an index consolidation program consolidating an entry into an index of a dictionary, in accordance with one embodiment of the present invention.
Figure 3:

FIG. 3 illustrates an example of an index consolidation program consolidating an entry into an index of a dictionary, in accordance with one embodiment of the present invention.

In this example, index consolidation program 110 receives term 302 to convert and store into an index of a dictionary. The term 302 includes over 45 characters, where the included characters are letters. Utilizing previously received lengths of prefix and hash values 304, index consolidation program 110 converts term 302 to consolidated term 306. The lengths of prefix and hash value 304 are represented by "P=8" and "H=6". For term 302, "DONAUDAM" represents the portion of the term associated with the received length of prefix of P=8, where index consolidation program 110 keeps the initial 8 characters of the term. "E39AC4" represents the portion of the term where a hash function was used to convert the other portion of the term into 6 hash characters. The 6 hash characters that index consolidation program 110 determines are unique to the remaining portion of the received term 302 include over 45 characters. Consolidated term 302 includes the "DONAUDAM" portion and the "E39AC4" portion, which index consolidation program 110 combines with a separator character "|".

Term 302 can have a document associated with it, where index consolidation program 110 can index term 302 in the form of consolidated term 306 and associate the document with the index entry. In the event index consolidation program 110 receives term 302 to search in the index, index consolidation program 110 can determine the index entry (i.e., consolidated term 306) for term 302 based on the lengths of prefix and hash value 304 and can identify the document associated with term 302.

Figure 4:
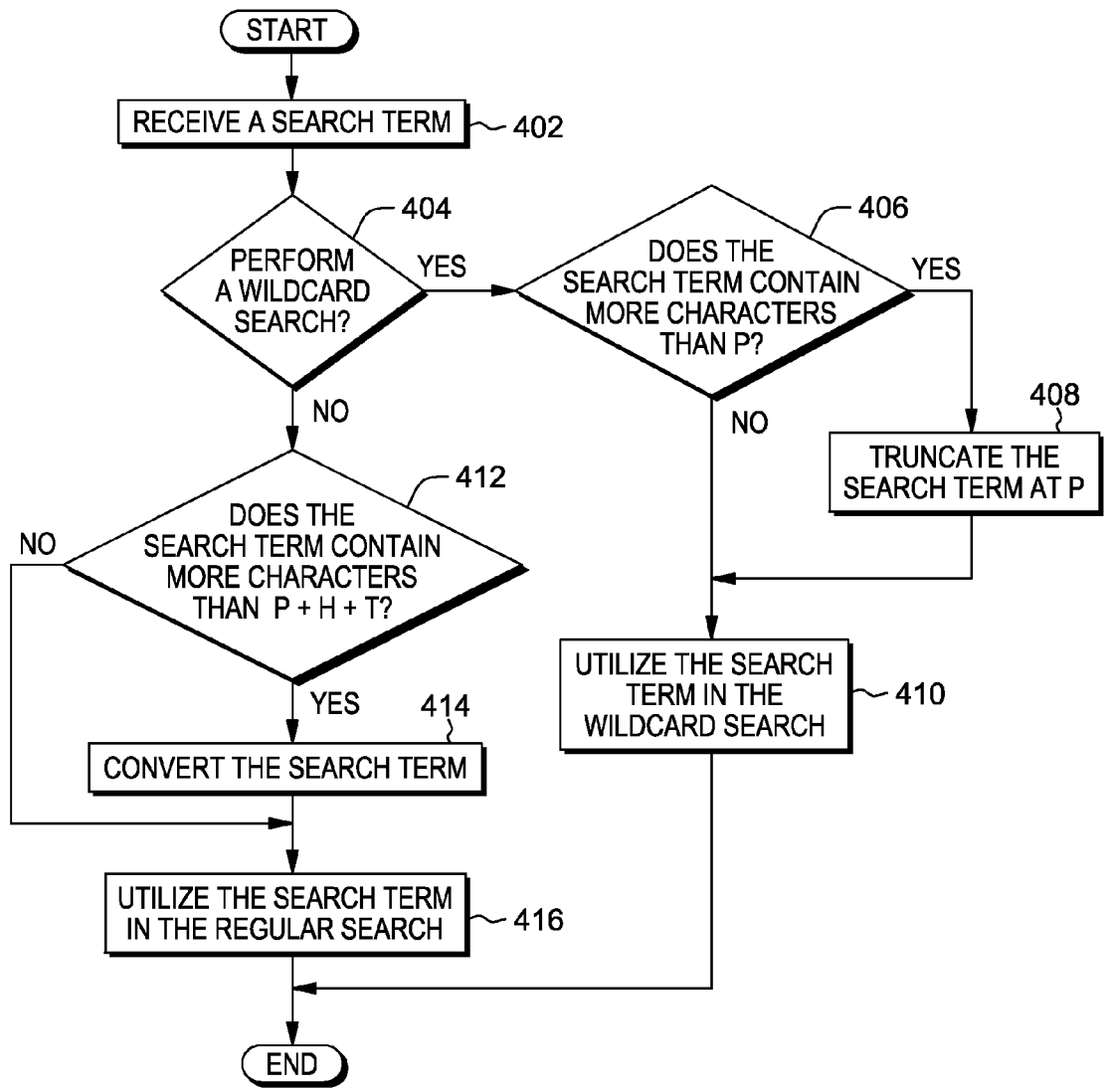
FIG. 4 is a flowchart depicting operational steps of an index consolidation program for managing search terms, in accordance with an embodiment of the present invention.

FIG. 4 is a flowchart depicting operational steps of an index consolidation program for managing search terms, in accordance with an embodiment of the present invention.

Index consolidation program 110 receives a search term (step 402). In this embodiment, a user of client device 104 utilizing user interface 114 inputs a search term which index consolidation program 110 receives. Index consolidation program 110 manages the received search term according to a type of search being performed for the received search term. In one example, a type of search is a regular search, where index consolidation program 110 can convert the received search term according to a length of prefix (P) and a length of hash value (H). In another example, another type of search is a wildcard search, where index consolidation program 110 can utilize a prefix portion of the received term, where the prefix portion of the received term is equal to a character length represented by the length of prefix (P), for the wildcard search.

Index consolidation program 110 determines whether to perform a wildcard search (decision step 404). In the event index consolidation program 110 determines to perform the wildcard search ("yes" branch, step 404), index consolidation program 110 determines if the search term contains more characters than P (decision step 406). In the event index consolidation program 110 determines not to perform a wildcard search ("no" branch, step 404), index consolidation program 110 determines if the search term contains more characters than P+H+T (decision step 412).

Index consolidation program 110 determines if the search term contains more characters than P (decision step 406). In the event index consolidation program 110 determines the search does not contain more characters than P, index consolidation program 110 utilizes the search term in the wildcard search (step 410). Index consolidation program 110 utilizes the search term as received in step 402, without altering the search term. In the event index consolidation program 110 determines the search term contains more characters than P ("yes" branch, step 406), index consolidation program 110 determines to truncate the search term at P (step 408).

Index consolidation program 110 truncates the search term at P (step 408). In this embodiment, index consolidation program 110 utilizes the length of prefix (P) to truncate the search term. In one example, index consolidation program 110 utilizes a length of prefix, P=6 and the search term contains 10 characters, such as "DAGMNBTIOM". Index consolidation program 110 can truncate the 10 character search term to 6 characters (i.e., P=6), where the search term becomes "DAGMNB". Index consolidation program 110 can truncate the search term to keep the initial characters (P=6) of the search term or to keep the final characters (P=6) of the search term.

Index consolidation program 110 utilizes the search in the wildcard search (step 410). In one embodiment, index consolidation program 110 can utilize the search term which contains a number of characters less than P to perform the wildcard search. In another embodiment, index consolidation program 110 can utilize the search term truncated at P to perform the wildcard search. The wildcard search can provide results for any entries in index 112 containing a portion of the search term, as dictated by the length of prefix (P).

Index consolidation program 110 determines if the search term contains more characters than P+H+T (decision step 412). In the event index consolidation program 110 determines the search term contains more (i.e., exceeds) characters than P+H+T, index consolidation program 110 converts the search term (step 414). In the event index consolidation program 110 determines the search term does not contain more characters than P+H+T, index consolidation program 110 utilizes the search term in the regular search (step 416).

Index consolidation program 110 converts the search term (step 414). In this embodiment, index consolidation program 110 converts the search term according to a length of prefix (P) and a length of hash value (H) that index consolidation program 110 utilizes to consolidate index 112. In one example, index consolidation program 110 receives a search term containing 20 characters, such as "DOMGNIKTGBMFSDSSV8S9". Index consolidation program 110 utilizes a predetermined P=5 and H=3 to convert the 20 character search term to "DOMGN|T4S".

Index consolidation program 110 then utilizes the search term in the regular search (step 416). The regular search identifies an index entry in index 112 which matches either the received search term or the converted search term according to the lengths of prefix and hash value for index 112. In one embodiment, index consolidation program 110 can utilize the search term which contains a number of characters less than P+H+T to perform the regular search. In another embodiment, index consolidation program 110 can utilize the search term, converted according to the lengths of prefix and hash value, to perform the regular search.

Figure 5:
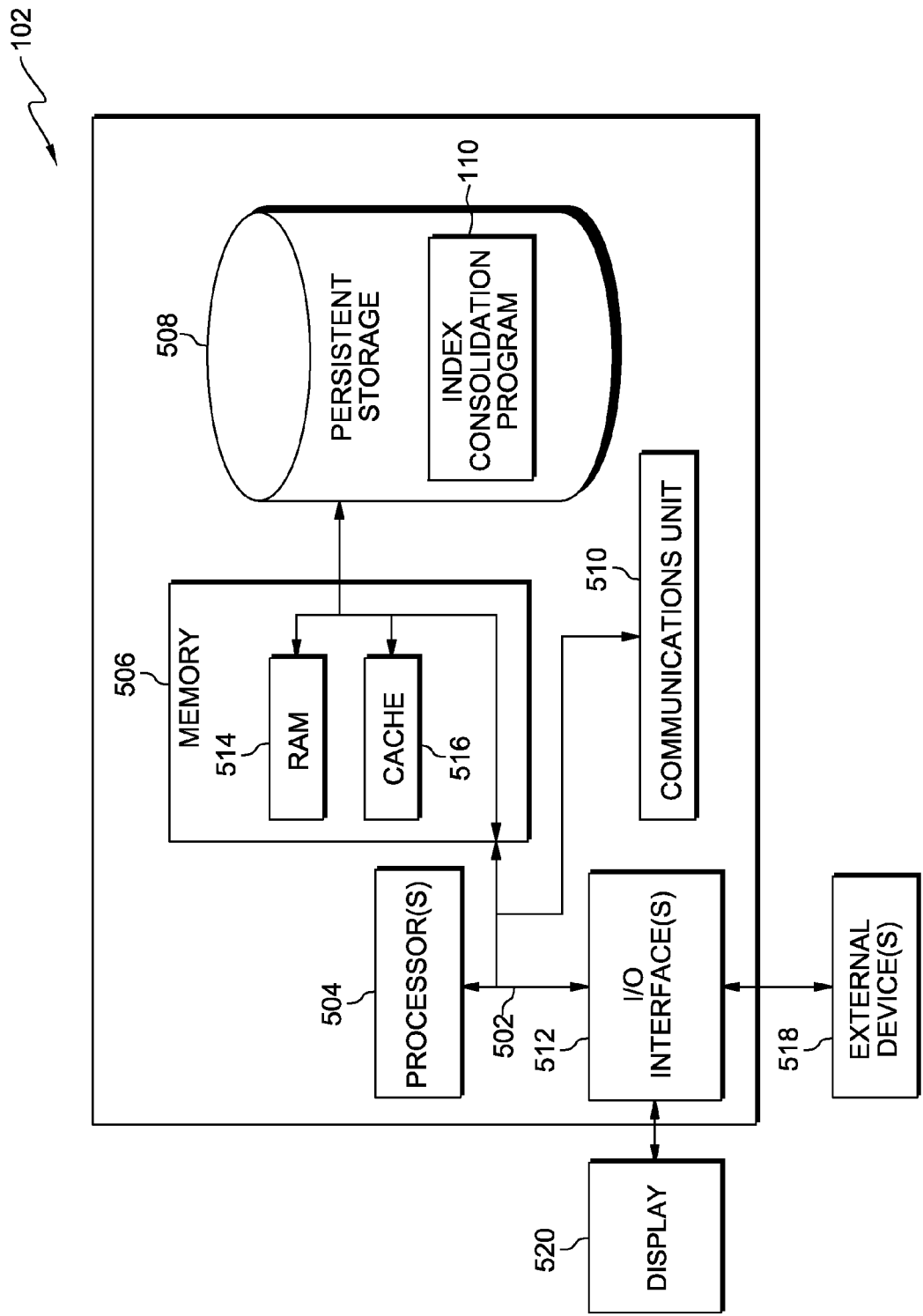
FIG. 5 is a block diagram of components of a computer system, such as the computer server of FIG. 1, in accordance with an embodiment of the present invention.

FIG. 5 depicts a block diagram of components of a computer, such as server computer 102, hosting index consolidation program 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. In general, memory 506 can include any suitable volatile or non-volatile computer readable storage device.

Index consolidation program 110 is stored in persistent storage 508 for execution by one or more of computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including systems and devices within or controlled by server computer 102. In these examples, communications unit 510 includes one or more wireless network interface cards. Communications unit 510 may provide communications through the use of either or both physical and wireless communications links. Computer programs and processes, such as index consolidation program 110, may be downloaded to persistent storage 508 through communications unit 510, or uploaded to another system through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 may also connect to a display 520. Display 520 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for consolidating an index entry of a dictionary, the computer program product comprising:

one or more computer readable tangible storage media and program instructions stored on at least one of the one or more storage media, the program instructions comprising:

program instructions to receive a set of parameters, wherein the set of parameters indicates at least a character length of prefix and a character length of hash value for converting terms for entry into an index;

program instructions to receive a first term for entry into the index;

program instructions to, responsive to determining the first term exceeds a sum of the character length of prefix, the character length of hash value, and a character length of a threshold value, determine to convert the first term for entry into the index;

program instructions to convert the first term for entry into the index according to the set of parameters, wherein a converted first term includes a first portion of characters of the first term representing a prefix, beginning at a first character of the first term and with a character length equal to the character length of prefix, and wherein the converted first term further includes a second portion of characters subsequent to and not including the characters of the first portion of the first term, reduced to a hash value with a character length equal to the character length of hash value; and program instructions to, responsive to determining the converted first term is not present in the index, store the converted first term in the index, wherein the first term is searchable based on the converted first term in the index.

2. The computer program product of claim 1 further comprising program instructions, stored on the one or more computer readable storage media, which when executed by a processor, cause the processor to:

receive a second term to search for in the index;

convert the second term according to the set of parameters, wherein a converted second term includes a first portion of characters of the second term representing a prefix, beginning at a first character of the second term and with a character length equal to the character length of prefix, and wherein the converted second term further includes a second portion of characters subsequent to and not including the characters of the first portion of the second term, reduced to a hash value with a character length equal to the character length of hash value; and determine if the converted second term is present in the index.

3. The computer program product of claim 2, wherein determining if the converted second term is present in the index further comprises program instructions, stored on the one or more computer readable storage media, which when executed by a processor, cause the processor to:

determine the converted second term matches the converted first term.

4. The computer program product of claim 1, further comprising program instructions, stored on the one or more computer readable storage media, which when executed by a processor, cause the processor to:

receive a second term to search for in the index;

truncate the second term at the character length of prefix; and determine if the truncated second term is present in the index.

5. The computer program product of claim 2, further comprising program instructions, stored on the one or more computer readable storage media, which when executed by a processor, cause the processor to:

responsive to determining the second term received for search in the index exceeds a sum of the character length of prefix, the character length of hash value, and the character length of threshold value, determine to convert the second term.

6. A computer system for consolidating an index entry of a dictionary, the computer system comprising:

one or more computer processors;

one or more computer readable storage media; and program instructions stored on the computer readable storage media for execution by at least one of the one or more computer processors, the program instructions comprising:

program instructions to receive a set of parameters, wherein the set of parameters indicates at least a character length of prefix and a character length of hash value for converting terms for entry into an index;

program instructions to receive a first term for entry into the index;

program instructions to, responsive to determining the first term exceeds a sum of the character length of prefix, the character length of hash value, and a character length of a threshold value, determine to convert the first term for entry into the index;

program instructions to convert the first term for entry into the index according to the set of parameters, wherein a converted first term includes a first portion of characters of the first term representing a prefix, beginning at a first character of the first term and with a character length equal to the character length of prefix, and wherein the converted first term further includes a second portion of characters subsequent to and not including the characters of the first portion of the first term, reduced to a hash value with a character length equal to the character length of hash value; and program instructions to, responsive to determining the converted first term is not present in the index, store the converted first term in the index, wherein the first term is searchable based on the converted first term in the index.

7. The computer system of claim 6 further comprising program instructions, stored on the one or more computer readable storage media, which when executed by a processor, cause the processor to:

receive a second term to search for in the index;

convert the second term according to the set of parameters, wherein a converted second term includes a first portion of characters of the second term representing a prefix, beginning at a first character of the second term and with a character length equal to the character length of prefix, and wherein the converted second term further includes a second portion of characters subsequent to and not including the characters of the first portion of the second term, reduced to a hash value with a character length equal to the character length of hash value; and determine if the converted second term is present in the index.

8. The computer system of claim 6, wherein determining if the converted second term is present in the index further comprises program instructions, stored on the one or more computer readable storage media, which when executed by a processor, cause the processor to:

determine the converted second term matches the converted first term.

9. The computer system of claim 7, further comprising program instructions, stored on the one or more computer readable storage media, which when executed by a processor, cause the processor to:

receive a second term to search for in the index;

truncate the second term at the character length of prefix; and determine if the truncated second term is present in the index.

10. The computer system of claim 7, further comprising program instructions, stored on the one or more computer readable storage media, which when executed by a processor, cause the processor to:

responsive to determining the second term received for search in the index exceeds a sum of the character length of prefix, the character length of hash value, and the character length of threshold value, determine to convert the second term.

* * * * *